(12) United States Patent
Hehemann et al.

(10) Patent No.: US 10,164,792 B2
(45) Date of Patent: Dec. 25, 2018

(54) USER STATION FOR A BUS SYSTEM AND METHOD FOR REDUCING LINE-CONDUCTED EMISSIONS IN A BUS SYSTEM

(71) Applicant: Robert Bosch GmbH, Stuttgart (DE)

(72) Inventors: Ingo Hehemann, Hagen A.T.W. (DE); Florian Hartwich, Reutlingen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 15/122,742

(22) PCT Filed: Feb. 27, 2015

(86) PCT No.: PCT/EP2015/054125
§ 371 (c)(1),
(2) Date: Aug. 31, 2016

(87) PCT Pub. No.: WO2015/132146
PCT Pub. Date: Sep. 11, 2015

(65) Prior Publication Data
US 2017/0063571 A1    Mar. 2, 2017

(30) Foreign Application Priority Data
Mar. 5, 2014   (DE) .................. 10 2014 204 048

(51) Int. Cl.
*H04L 12/413* (2006.01)
*H04L 25/02* (2006.01)
*H04L 12/40* (2006.01)

(52) U.S. Cl.
CPC ...... *H04L 12/413* (2013.01); *H04L 12/40039* (2013.01); *H04L 25/028* (2013.01); *H04L 2012/40215* (2013.01)

(58) Field of Classification Search
None
See application file for complete search history.

(56) References Cited

U.S. PATENT DOCUMENTS 6,580,931 B1 *   6/2003   Shiotsu ................. H04B 15/00
                                                                     343/702
2002/0038396 A1 *   3/2002   Kanzaki ............. G06F 13/4226
                                                                     710/100

(Continued)

FOREIGN PATENT DOCUMENTS

DE      10 000 305 A1      7/2001
DE   10 2011 007766 A1    10/2012

(Continued)

OTHER PUBLICATIONS

International Search Report for PCT/EP2015/054125, dated Jun. 1, 2015, 2 pages.

*Primary Examiner* — Andrew C Oh
(74) *Attorney, Agent, or Firm* — Norton Rose Fulbright US LLP; Gerard Messina

(57) ABSTRACT

A user station for a bus system and a method for reducing line-conducted emissions in a bus system, in which the user station includes a transceiver for transmitting or receiving a message from at least one additional user station of the bus system via the bus system. In the bus system, exclusive, collision-free access to a bus of the bus system by a user station is at least temporarily ensured. The transceiver includes an emission control device for controlling the properties of the transceiver to reduce line-conducted emissions in the bus system. The transceiver is also configured for switching the emission control device on or off as a function of the arbitration phase and the data area of the message.

10 Claims, 4 Drawing Sheets

(56) References Cited

U.S. PATENT DOCUMENTS

2010/0201399 A1    8/2010  Metzner et al.
2015/0200697 A1*   7/2015  Wang .................... H04B 1/123
                                                        455/310

FOREIGN PATENT DOCUMENTS

DE    10 2012 200 997 A1    2/2013
WO       2012/038472 A1    3/2012

* cited by examiner

USER STATION FOR A BUS SYSTEM AND METHOD FOR REDUCING LINE-CONDUCTED EMISSIONS IN A BUS SYSTEM

FIELD OF THE INVENTION

The present invention relates to a user station for a bus system and a method for reducing line-conducted emissions in a bus system, in which a control of the properties of a transceiver of a user station of a bus system takes place outside arbitration.

BACKGROUND INFORMATION

The CAN bus system has become widespread for communication between two or more bus users such as sensor(s), control unit(s), etc. In the CAN bus system, messages are transmitted with the aid of the CAN protocol, as described in the CAN specification in ISO 11898. As the number of intelligent sensors grows and control units become increasingly networked in vehicles, the number of user stations on the CAN bus and the data volume on the CAN bus are continually increasing.

Patent document DE 10 000 305 A1 discusses the controller area network (CAN) and an enhancement of the CAN, referred to as time-triggered CAN (TTCAN). The method for controlling media access used in the CAN is based on bit-wise arbitration. In the CAN, the bit-wise arbitration is carried out based on a leading identifier within the message that is to be transmitted via the bus.

As already discussed in DE 10 2012 200 997, during bit-wise arbitration multiple user stations may simultaneously transmit data to the bus system without interfering with the data transmission.

Technologies such as CAN FD have recently been provided in which messages are transmitted, etc., corresponding to the specification "CAN with Flexible Data-Rate, Specification Version 1.0" (source: http://www.semiconductors-.bosch.de). In such technologies, the maximum possible data rate is increased beyond a value of 1 Mbit/s by using higher clocking in the area of the data fields.

The bus topology plays a major role for the signal integrity, and thus for rapid data transmission. In particular, it is problematic that reflections arise during the data transmission at each branch of the data lines for a user station of a CAN bus system. These reflections are superimposed on the transmitted signals and interfere with reception by the receiver. The larger the reflections, the slower the data rate that must be selected in order to still be able to reliably transmit the signal.

The most important demands on a CAN high-speed transceiver (CAN HS transceiver), apart from adhering to the functional parameters, are to meet the requirements with regard to:

emissions, direct power injection (DPI), which is a method for measuring the immunity to interference in the range of electromagnetic compatibility (EMC), and electrostatic discharge (ESD).

With the introduction of CAN FD by some CAN users, bit rates of higher than 1 Mbit per second (1 Mbps), 2 Mbps, 4 Mbps, and possibly higher are now being used. It is problematic that, despite increasing the data rate for the CAN bus system, the manufacturers call for the same values for the emission limits as for the data rate for a conventional CAN bus system, which is configured according to "Hardware Requirements for CAN Interfaces 1.3," for example. At the present time, CAN FD cannot comply with these limits when the higher bit rates are used. The reason for noncompliance with the limits is the increased energy density for the same transceiver, since more edges per unit time are driven in the CAN signal.

Another requirement which cannot be met by the related art is the demand by the CAN users for the emission limits to be met at the two bus lines, which are ±10 ohms, even for asymmetrical resistances in the decoupling network. This demand should reflect the different line resistances of the two bus lines in the actual vehicle.

SUMMARY OF THE INVENTION

An object of the present invention, therefore, is to provide a user station for a bus system and a method which address the problems mentioned above. In particular, the aim is to provide a user station for a bus system and a method in which the emissions are reduced to a minimum during normal operation of a CAN transceiver, so that the emission limits for the CAN users are also met for CAN HS or CAN FD.

The object is achieved by a user station for a bus system having the features described herein. The user station includes a transceiver for transmitting or receiving a message from at least one additional user station of the bus system via the bus system, whereby the bus system at least temporarily ensures exclusive, collision-free access to a bus of the bus system by a user station, the transceiver including an emission control device for controlling the properties of the transceiver in order to reduce line-conducted emissions in the bus system, and the transceiver also being configured for switching the emission control device on or off as a function of the arbitration phase and the data area of the message.

With the user station, it is possible to meet the emission limits presently stipulated for CANs, even for CAN FD bit rates. In addition, emission limits may be met during measurement with asymmetrical resistances in a decoupling network of the bus system.

Another advantage is that an automatic adaptation to bus line conditions in the field is possible.

The user station is therefore also suitable for use in more highly clocked systems such as CAN FD, etc. The above-described user station is suitable for use by CAN FD, as well as in applications in which it has not been possible thus far to further increase the data rate due to the stipulated emission limits.

In addition, the maximum transmittable data rate for CAN FD may be increased with the above-described user station.

Another advantage is that with the above-described user station, it is much easier to achieve an increase in the data rate by transmitting messages analogously to other data transmission protocols such as Ethernet, etc.

In principle, the user station may be used in all two-wire interfaces that are characterized by a communication phase in which it is ensured that only one user is transmitting.

Further advantageous embodiments of the user station are described in the further descriptions herein.

The user station may also include a communication control device for controlling the communication in the bus system, the communication control device or the transceiver including a detection device for detecting a data area.

The transceiver may have a detection device which is configured in such a way that it recognizes the data area based on detection of a BRS bit at the end of an arbitration phase.

According to another variant, the transceiver is configured for recognizing the data area based on a switching signal from the communication control device. The communication control device may include a detection device which is configured in such a way that, after recognizing the data area, it outputs a switching signal to the transceiver via a terminal.

According to yet another variant, the transceiver includes a detection device which is configured in such a way that it recognizes the data area based on monitoring of a transmission signal. The detection device may include a counter for counting falling or rising edges of the transmission signal. The detection device may also include a timing element for resetting the counter.

The above-described user station may be part of a bus system which includes a bus, and at least two user stations that are connected to one another via the bus in such a way that they are able to communicate with one another. At least one of the at least two user stations is a user station described above.

Moreover, the above-mentioned object is achieved by a method for reducing line-conducted emissions in a bus system having the features described herein. The method includes the following steps: transmitting, with a transceiver, a message from at least one additional user station of the bus system via the bus system, whereby the bus system at least temporarily ensures an exclusive, collision-free access to a bus of the bus system by a user station, controlling the properties of the transceiver, using an emission control device of the transceiver, to reduce line-conducted emissions of the bus system, and switching the emission control device on or off as a function of the arbitration phase and the data area of the message.

The method provides the same advantages as mentioned above with regard to the user station.

Further possible implementations of the present invention include combinations, even if not explicitly mentioned, of features or specific embodiments described above or below with regard to the exemplary embodiments. Those skilled in the art will also add enhancements or supplements to the particular basic form of the present invention.

The present invention is described in greater detail below with reference to the appended drawings, and based on exemplary embodiments.

Unless stated otherwise, similar or functionally corresponding elements are provided with the same reference numerals in the figures.

DETAILED DESCRIPTION

Figure 1:
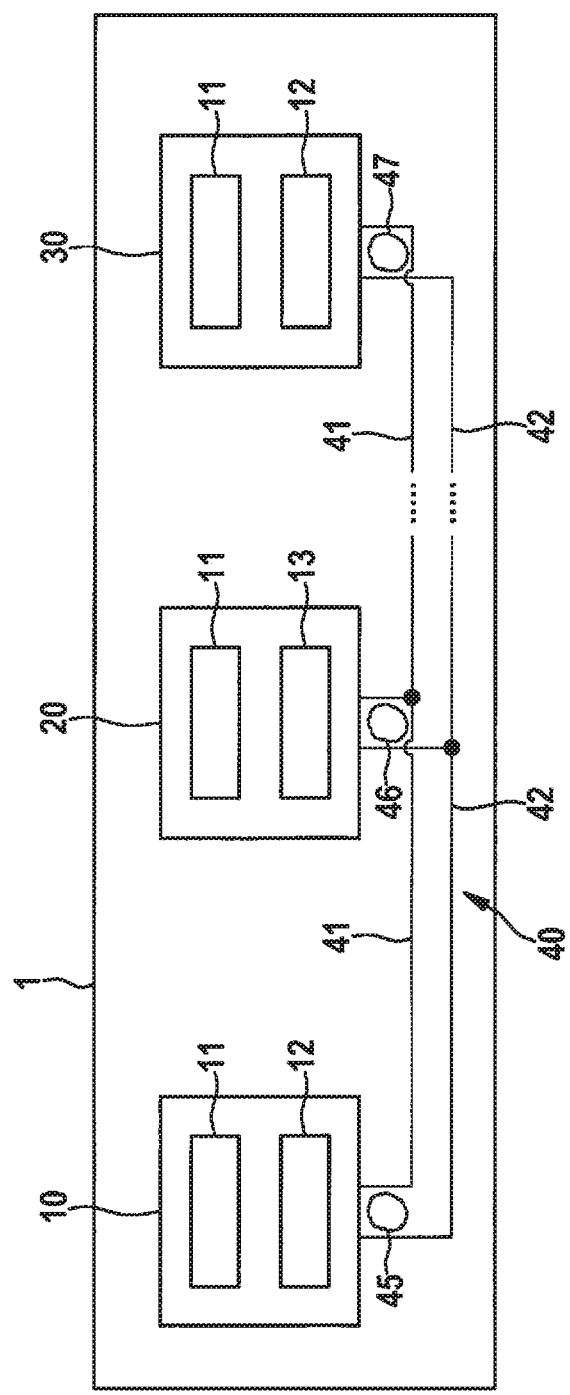
FIG. 1 shows a simplified block diagram of a bus system according to a first exemplary embodiment.

FIG. 1 shows a bus system 1 which may be, for example, a CAN bus system, a CAN FD bus system, etc. Bus system 1 may be used in a vehicle, in particular a motor vehicle, an aircraft, etc., or in a hospital, etc.

In FIG. 1, bus system 1 includes a plurality of user stations 10, 20, 30, each connected to a bus 40 including a first bus wire 41 and a second bus wire 42. Bus wires 41, 42 may also be referred to as CAN_H and CAN_L, and are used for coupling the dominant levels in the transmission state. Messages 45, 46, 47 in the form of signals may be transmitted between individual user stations 10, 20, 30 via bus 40. User stations 10, 20, 30 may be, for example, control units or display devices of a motor vehicle.

As shown in FIG. 1, user stations 10, 30 each include a communication control device 11 and a transceiver 12. In contrast, user station 20 includes a communication control device 11 and a transceiver 13. Transceivers 12 of user stations 10, 30 and transceiver 13 of user station 20 are each directly connected to bus 40, even though this is not illustrated in FIG. 1.

Communication control device 11 is used for controlling a communication of the particular user station 10, 20, 30 via bus 40 with another user station of user stations 10, 20, 30 connected to bus 40. Transceiver 12 is used for transmitting messages 45, 47 in the form of signals, and for reducing line-conducted emissions in bus system 1 in order to meet the emission limits for CAN FD bit rates, as described below in greater detail. Line-conducted emissions may occur on bus 40. Communication control device 11 may be configured as a conventional CAN controller. Transceiver 13 may be configured as a conventional CAN transceiver.

Figure 2:
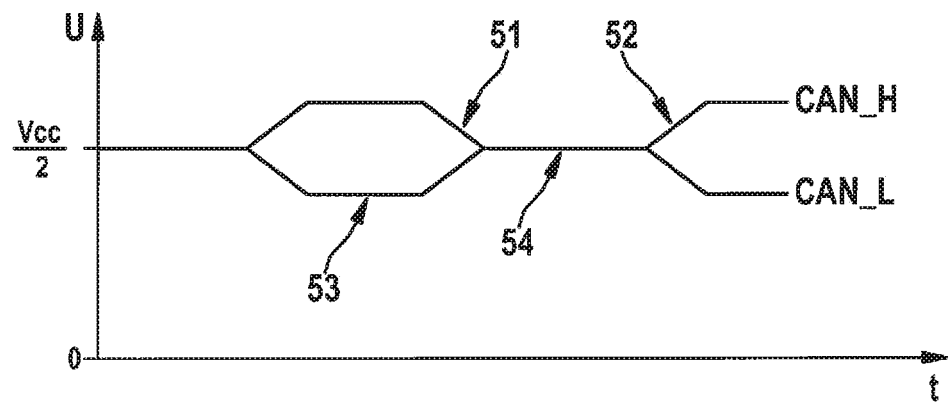
FIG. 2 shows a setpoint voltage curve of a bus signal as a function of time in the bus system according to the first exemplary embodiment.
Figure 4:
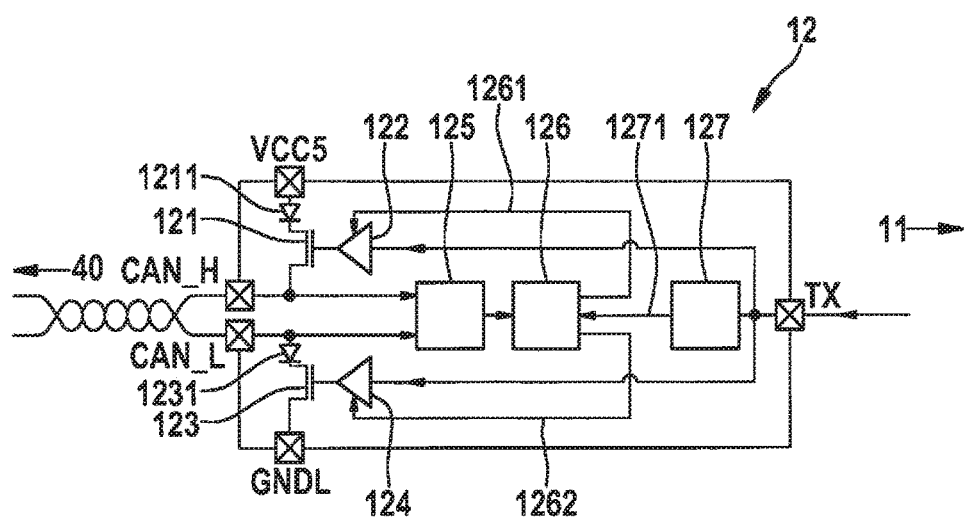
FIG. 4 shows a block diagram of a transceiver of a user station of the bus system according to the first exemplary embodiment.

FIG. 2 shows a voltage curve U as a function of time t with switching edges 51, 52, which is generated by transceiver 12, illustrated in greater detail in FIG. 4. Switching edge 51 corresponds to a transition of the signal from dominant state 53 to recessive state 54. Switching edge 52 corresponds to a transition of the signal from recessive state 54 to dominant state 53. The illustrated voltage curve has switching edges 51, 52 as a setpoint voltage curve which is to be generated by transceiver 12. Dominant state 53 corresponds to a dominant bus state. Recessive state 54 corresponds to a recessive bus state.

Figure 3:
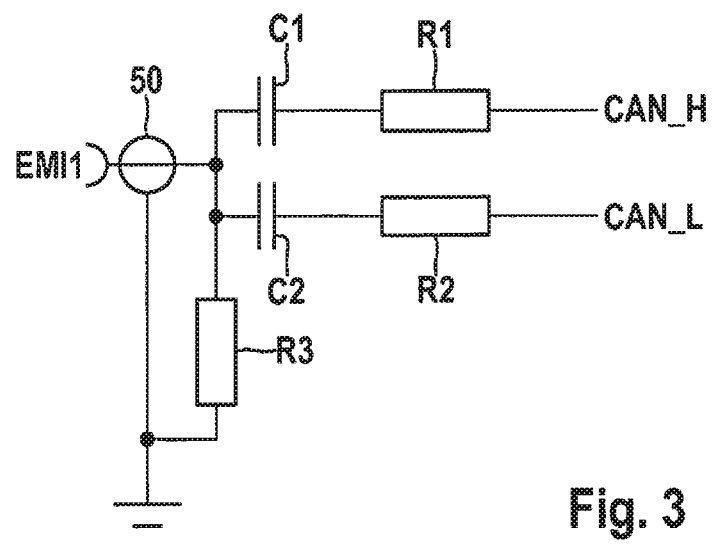
FIG. 3 shows an electrical circuit diagram of a decoupling network for measuring line-conducted emissions in the bus system according to the first exemplary embodiment.

FIG. 3 shows a decoupling network at the two bus wires for CAN_H and CAN_L of bus 40. The decoupling network is used for measuring the line-conducted emissions from CAN transceivers 12 and transceiver 13. In the decoupling network, a series connection made up of a first capacitor C1 and a first resistor R1 is associated with bus wire CAN_H, and a series connection made up of a second capacitor C2 and a second resistor R2 is associated with bus wire CAN_L. At their sides, first and second capacitors C1, C2 are each connected to a third resistor R3 and a measuring device 50 for decoupling an emission limit EMI1. Resistor R3 is grounded at its other end.

The line-conducted emissions from CAN transceiver 13 and transceivers 12 are measured according to the 150 ohm method (IEC 61967-4, Integrated circuits, Measurement of electromagnetic emissions, 150 kHz to 1 GHz—Part 4: Measurement of conducted emissions—1/150 direct coupling method) and according to IEC 62228 (EMC evaluation of CAN transceivers). During the emission measurement with the decoupling network from FIG. 3, a divided-down alternating voltage (AC) signal of the two bus wires CAN_H and CAN_L is evaluated. For third resistor R3, measuring device 50 carries out an additional measurement with a 50-ohm internal resistance.

The influencing variables for emissions are as follows:
matching the two transmission levels for CAN_H, CAN_L with regard to driver current and internal resistance, control timing between the two transmission levels, and current-voltage (I-U) characteristic curve of the two transmission levels.

Transceiver 13 of user station 20 controls the influencing variables for emissions in such a way that the limits under present requirements for CAN HS, i.e., up to 500 kbits per second (500 kbps), are met.

In contrast, FIG. 4 shows the design of transceiver 12 of user stations 10, 30 in greater detail. Accordingly, transceiver 12 is connected on one side to bus 40, and on the other side to communication control device 11. Thus, transceiver 12 may receive a transmission signal TX from communication control device 11 and couple it to bus 40.

In FIG. 4, transceiver 12 has a path for signal CAN_H for bus wire 41, whereby a first transistor 121 and a first driver (DRV) 122 are situated in the path, and a path for signal CAN_L for bus wire 42, whereby a second transistor 123 and a second driver (DRV) 124 are situated in the path. First transistor 121 is connected to voltage VCC5 (illustrated in FIG. 2) via a diode 1211. Second transistor 123 is connected to a terminal for signal CAN_L via a diode 1231. In addition, second transistor 123 is connected to ground GNDL, i.e., is grounded. The two signals CAN_H and CAN_L are supplied to a voltage symmetry measuring device 125 and subsequently to an emission control device 126. Emission control device 126 is switched on or off by a detection device 127 via a connection 1271. When emission control device 126 is switched on and thus in operation, it may output, via a connection 1261, a signal to first driver (DRV) 122 for setting influencing variables of the emissions in path CAN_H. In addition, the emission control device may output, via a connection 1262, a signal to second driver (DRV) 124 for setting influencing variables of the emissions in path CAN_L.

Voltage symmetry measuring device 125 measures the AC aggregate signal from CAN_H and CAN_L. Detection device 127 detects and determines a phase during the CAN communication which is suitable for the control using emission control device 126.

Figure 5:
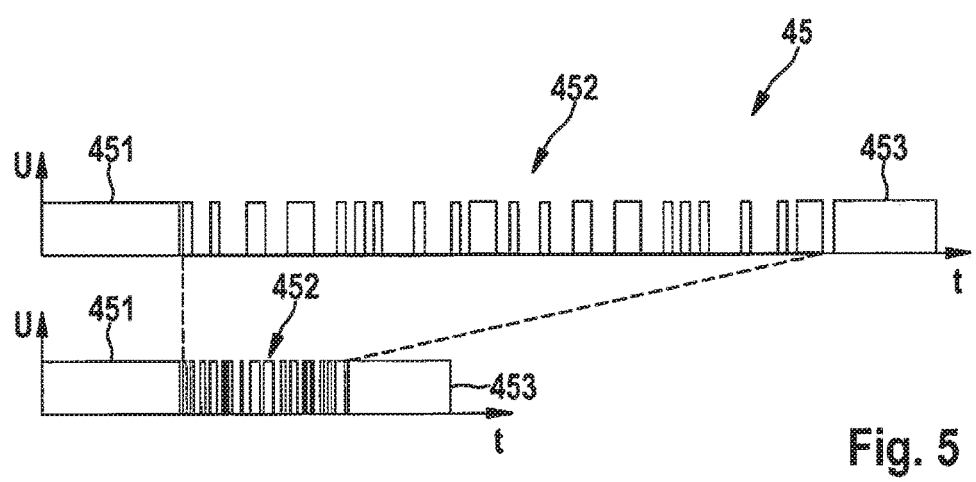
FIG. 5 shows a diagram for illustrating the structure of a message that is transmitted from a user station of the bus system according to the first exemplary embodiment.

As shown in FIG. 5, with reference to message 45 for a CAN frame at the top in FIG. 5 and a CAN FD frame at the bottom in FIG. 5, in each case as voltage U as a function of time t, the CAN communication on bus 40 may basically be divided into two different phases, namely, arbitration phases 451, 453 (only schematically illustrated), and a data area 452, which for CAN HS is also referred to as the data field, and which for CAN FD is also referred to as the data phase. For CAN FD, in comparison to the classical CAN, the bit rate for the subsequent data phase is increased to 2, 4, 8 Mbps, for example, at the end of the arbitration phase. Consequently, for CAN FD the bit rate in arbitration phases 451, 453 is less than the bit rate in data area 452. For CAN FD, data area 452 is significantly shorter than data area 452 of the CAN frame. However, CAN FD still allows transmission of more data than with CAN HS, despite a shorter data phase.

Phases or areas are always suitable for control using emission control device 126 when it is ensured that user station 10, 30 itself transmits, and no other user station of bus system 1 transmits. For CAN and CAN FD, this is the case in data area 452 in FIG. 5.

In the present exemplary embodiment, the recognition of the end of arbitration phase 451, 453 or of data area 452 using detection device 127 takes place via a BRS bit which is present at the end of arbitration phases 451, 453. Transceiver 12 is capable of decoding the data transmission protocol used in data area 452. Thus, transceiver 12 is a partial networking transceiver.

When detection device 127 has detected data area 452, it activates emission control device 126 via connection 1271, so that an emission control and in particular an emission regulation is carried out. Emission control device 126 may detect various variables for this purpose. For example, emission control device 126 may detect a measure for emission limit EMI1, which may be tapped at CAN_H and CAN_L internally with respect to the transceiver, i.e., in transceiver 12. Emission control device 126 may also detect driver currents at CAN_H and CAN_L during dominant phases transmitted by transceiver 12 itself.

The emission control by emission control device 126 begins with recognition of data area 452, and sets the influencing variables for the transmission levels of CAN_H and CAN_L in such a way that the line-conducted emissions are minimized. For this purpose, a method that is described in an unpublished prior application by the present applicant may be used. The emission control is terminated by emission control device 126 at the end of data area 452. The settings used are stored, and are maintained until detection device 127 detects next data area 452, or until the end of an arbitration phase 451, 453 is detected and thus recognized. Emission control device 126 may thus be switched on or off as a function of arbitration phase 451; 453 and of data area 452 of message 45 or of messages 46; 47.

User station 30 operates in the same way as user station 10.

According to the present exemplary embodiment, transceiver 12 may be implemented in a particularly cost-effective manner when a protocol controller for the partial network function which is integrated into transceiver 12 is present and is usable for recognizing, among other things, the BRS bit at the end of the arbitration. In this regard, the protocol controller should be operated by a sufficiently accurate clock pulse.

Figure 6:
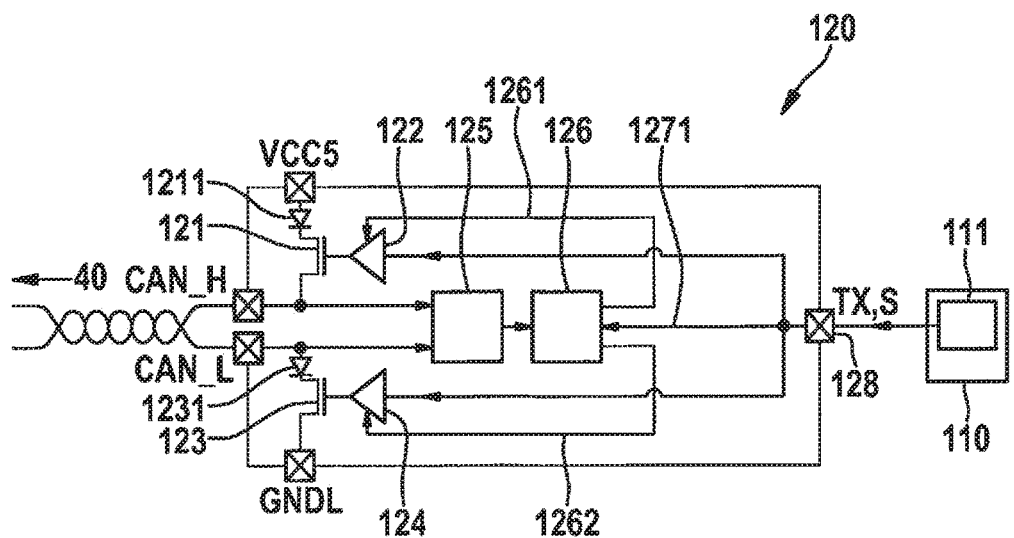
FIG. 6 shows a block diagram of a transceiver of a user station of the bus system according to a second exemplary embodiment.

FIG. 6 shows a communication control device 110 and a transceiver 120 according to a second exemplary embodiment. For transceiver 120, data area 452 is recognized using a data field detection device 111 of communication control device 110. Data field detection device 111 may be implemented by the CAN module of communication control device 110. Communication control device 110 outputs the result of the recognition to transceiver 120 via a terminal 128, with the aid of a switching signal S from detection device 111. Switching signal S signals data area 452. In this case, transceiver 120 and communication control device 110 each include an additional pin for terminal 128.

Otherwise, the bus system according to the present exemplary embodiment has the same design as bus system 1 according to the first exemplary embodiment.

In transceiver 120 according to the present exemplary embodiment, only two additional pins are necessary for terminal 128. This is more cost-effective than the approach according to the first exemplary embodiment, in which a protocol controller is necessary which is integrated into transceiver 12 and which recognizes, among other things, the BRS bit at the end of the arbitration and which is to be operated by a sufficiently accurate clock pulse.

Figure 7:
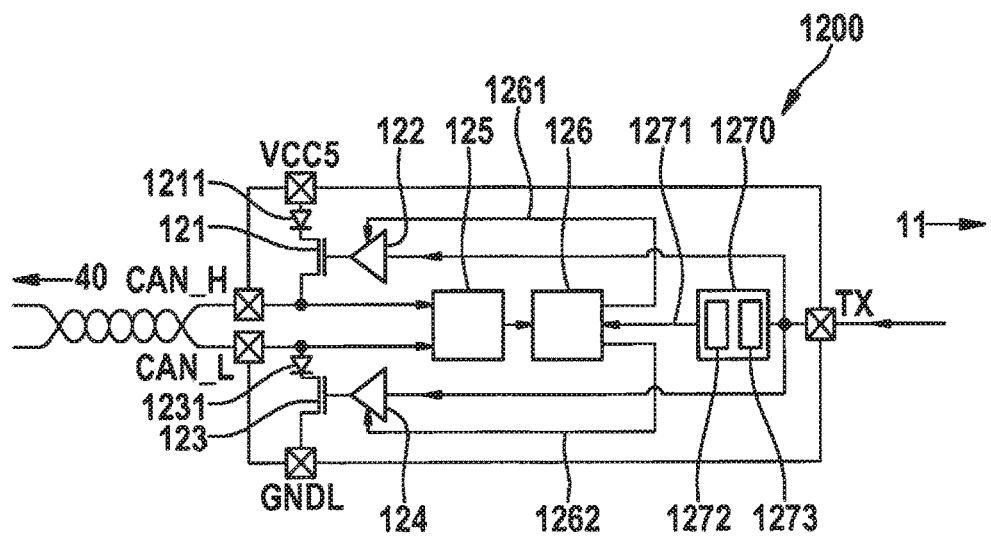
FIG. 7 shows a block diagram of a transceiver of a user station of the bus system according to a third exemplary embodiment.

FIG. 7 shows a transceiver 1200 according to a third exemplary embodiment. In transceiver 1200, the recognition of data area 452 using a detection device 1270 takes place by monitoring transmission signal TX. Thus, the input of transmission signal TX of transceiver 1200 is evaluated in order to recognize data area 452. More precisely, in order to detect and thus recognize data area 452, the falling edges of transmission signal TX arriving at transceiver 1200 from communication control device 11 are observed. Detection device 1270 assesses, based on the counted falling edges of transmission signal TX, whether transceiver 1200 is functioning as a transmitter in data area 452. For this reason, data field detection device 1270 includes a counter 1272 which is configured in particular as a 5-bit counter. The falling edges of transmission signal TX are used as a clock input of detection device 1270 or of counter 1272. Alternatively, counter 1272 may count the rising edges of transmission signal TX.

Use is hereby made of the fact that in arbitration phases 451, 453, a maximum of 35 bits without stuffing bit(s) (stuff condition) are transmitted; i.e., a maximum of 17 falling edges appear. These may be detected, for example, by using a 5-bit counter. Counter 1272 is reset via a timing element 1273. The bit rate of arbitration phases 451, 453 is transmitted to detection device 1270. Timing element 1273 is typically 8 bits. However, timing element 1273 may also be at least 6 bits, and a maximum of 11 bits. The selection of timing element 1273 depends on the particular data transmission protocol of the bus system used.

Otherwise, the bus system according to the present exemplary embodiment has the same design as bus system 1 according to the first exemplary embodiment.

According to the present exemplary embodiment, transceiver 1200 is usable for CAN HS as well as for CAN FD. By use of transceiver 1200, data area 452 is recognized without additional pins at transceiver 1200 and communication control device 11. In addition, an additional protocol controller as in the first exemplary embodiment is not necessary.

A reduction in the line-conducted emissions for any application may be achieved by use of transceiver 1200.

All of the embodiments described above of bus system 1 of user stations 10, 20, 30 and of the method according to the first through third exemplary embodiments may be used alone or in any possible combination. In addition, in particular the following modifications are conceivable.

Bus system 1 described above according to the first through third exemplary embodiments is described with reference to a bus system based on the CAN protocol. However, bus system 1 according to the first through third exemplary embodiments may also be some other type of communication network. It is advantageous, but not a mandatory requirement, for bus system 1 to ensure, at least for certain time periods, an exclusive, collision-free access by a user station 10, 20, 30 to bus 40 or a shared channel of bus 40.

Bus system 1 according to the first through third exemplary embodiments is in particular a CAN network or a CAN FD network or, with regard to the emission control and in particular emission regulation carried out by emission control device 126, a FlexRay network.

The number and configuration of user stations 10, 20, 30 in bus systems 1 according to the first through third exemplary embodiments is arbitrary. In particular, it is also possible for only user stations 10 or user stations 30 to be present in bus systems 1 in the first through third exemplary embodiments.

To achieve an even higher data rate, within the CAN frame of messages 45, 46, 47 the data transmission may take place analogously to data transmission protocols, such as Ethernet, etc.

The functionality of the exemplary embodiments described above may be implemented in a transceiver 12, a CAN transceiver, a transceiver chipset, a CAN transceiver chipset, or also in a communication control device 11, etc. Additionally or alternatively, they may be integrated into existing products. In particular, it is possible to implement the functionality in question either in the transceiver as a separate electronic module (chip), or embedded in an integrated overall approach in which only one electronic module (chip) is present.

What is claimed is:

1. A user station for a bus system, comprising:
a transceiver to transmit or receive a message from at least one additional user station of the bus system via the bus system, wherein in the bus system, exclusive, collision-free access to a bus of the bus system by a user station is at least temporarily ensured;
wherein the transceiver includes an emission control device to control the properties of the transceiver to reduce line-conducted emissions in the bus system, and
wherein the transceiver is configured to switch the emission control device on or off as a function of the arbitration phase and the data area of the message.

2. The user station of claim 1, further comprising:
a communication control device to control the communication in the bus system, wherein the communication control device or the transceiver includes a detection device to detect a data area.

3. The user station of claim 2, wherein the transceiver includes a detection device configured to recognize the data area based on detection of a BRS bit at the end of an arbitration phase.

4. The user station of claim 2, wherein the transceiver is configured to recognize the data area based on a switching signal from the communication control device.

5. The user station of claim 2, wherein the communication control device includes a detection device to, after recognizing the data area, output a switching signal to the transceiver via a terminal.

6. The user station of claim 2, wherein the transceiver includes a detection device configured to recognize the data area based on monitoring of a transmission signal.

7. The user station of claim 6, wherein the detection device includes a counter for counting falling or rising edges of the transmission signal.

8. The user station of claim 7, wherein the detection device includes a timing element to reset the counter.

9. A bus system, comprising:
a bus;
at least two user stations connected to one another via the bus so that they are able to communicate with one another;
wherein at least one of the at least two user stations includes a user station which includes:

a transceiver to transmit or receive a message from at least one additional user station of the bus system via the bus system, wherein in the bus system, exclusive, collision-free access to a bus of the bus system by a user station is at least temporarily ensured;

wherein the transceiver includes an emission control device to control the properties of the transceiver to reduce line-conducted emissions in the bus system, and wherein the transceiver is configured to switch the emission control device on or off as a function of the arbitration phase and the data area of the message.

10. A method for reducing line-conducted emissions in a bus system, the method comprising:

transmitting, with a transceiver, a message from at least one additional user station of the bus system via the bus system, wherein the bus system at least temporarily ensures an exclusive, collision-free access to a bus of the bus system by a user station;

controlling the properties of the transceiver, using an emission control device of the transceiver, to reduce line-conducted emissions of the bus system; and switching the emission control device on or off as a function of the arbitration phase and the data area of the message.

* * * * *